US012080464B2

(12) United States Patent
Dai et al.

(10) Patent No.: US 12,080,464 B2
(45) Date of Patent: Sep. 3, 2024

(54) LAMINATED TRANSFORMER AND MANUFACTURING METHOD THEREOF

(71) Applicant: Silergy Semiconductor Technology (Hangzhou) LTD, Hangzhou (CN)

(72) Inventors: Ke Dai, Hangzhou (CN); Jian Wei, Hangzhou (CN); Jiajia Yan, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 844 days.

(21) Appl. No.: 16/719,709

(22) Filed: Dec. 18, 2019

(65) Prior Publication Data

US 2020/0211759 A1 Jul. 2, 2020

(30) Foreign Application Priority Data

Dec. 29, 2018 (CN) ......................... 201811641032.4

(51) Int. Cl.
*H01F 27/28* (2006.01)
*H01F 27/24* (2006.01)
*H01F 27/32* (2006.01)

(52) U.S. Cl.
CPC ......... *H01F 27/2804* (2013.01); *H01F 27/24* (2013.01); *H01F 27/323* (2013.01); *H01F 2027/2809* (2013.01)

(58) Field of Classification Search
CPC ......... H01F 27/2804; H01F 2027/2809; H01F 17/0013; H01F 17/0006; H01F 5/003; H01F 27/24; H01F 27/323
USPC .................................................. 336/200, 232
See application file for complete search history.

(56) References Cited

U.S. PATENT DOCUMENTS

| | | | | |
|---|---|---|---|---|
| 2,613,430 | A | 10/1952 | Sefton et al. | |
| 4,557,039 | A | 12/1985 | Manderson | |
| 5,877,581 | A | 3/1999 | Inoi et al. | |
| 6,583,707 | B2 | 6/2003 | Ngo et al. | |
| 7,375,608 | B2 * | 5/2008 | Suzuki ................ | H01F 17/0013 336/200 |
| 10,586,647 | B2 | 3/2020 | Takeda | |
| 2006/0158301 | A1 * | 7/2006 | Shinkai ............... | H01F 17/0013 336/232 |
| 2017/0140864 | A1 * | 5/2017 | Arai ....................... | H01F 1/0306 |
| 2017/0365386 | A1 * | 12/2017 | Arai .................... | H01F 41/0233 |

FOREIGN PATENT DOCUMENTS

| | | | | |
|---|---|---|---|---|
| EP | 1318531 A1 * | 6/2003 | ......... | H01F 17/0013 |
| JP | 2002190410 A * | 7/2002 | | |
| WO | WO-2005043564 A1 * | 5/2005 | ......... | H01F 17/0013 |
| WO | WO-2017038505 A1 * | 3/2017 | ......... | H01F 17/0013 |

* cited by examiner

*Primary Examiner* — Tszfung J Chan

(57) ABSTRACT

A laminated transformer can include: a plurality of magnetic layers; a plurality of coil layers including a primary coil having a first type of coil layer, and a secondary coil having a second type of coil layer, where each coil layer is laminated between a pair of the plurality of magnetic layers; and a plurality of non-magnetic layers, where a first of the plurality of non-magnetic layers is disposed between an adjacent pair of the coil layers in order to increase a coupling coefficient between the primary and secondary coils.

10 Claims, 11 Drawing Sheets

LAMINATED TRANSFORMER AND MANUFACTURING METHOD THEREOF

RELATED APPLICATIONS

This application claims the benefit of Chinese Patent Application No. 201811641032.4, filed on Dec. 29, 2018, which is incorporated herein by reference in its entirety.

FIELD OF THE INVENTION

The present invention generally relates to the field of power electronics, and more particularly to driving circuits and methods for driving a light-emitting diode (LED) load.

BACKGROUND

The ferrite (powder core) lamination process has been widely used in the production of commodity inductors because the lamination process can achieve a small volume of ultra-thin inductance. However, some transformers are made by multi-layer technology.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
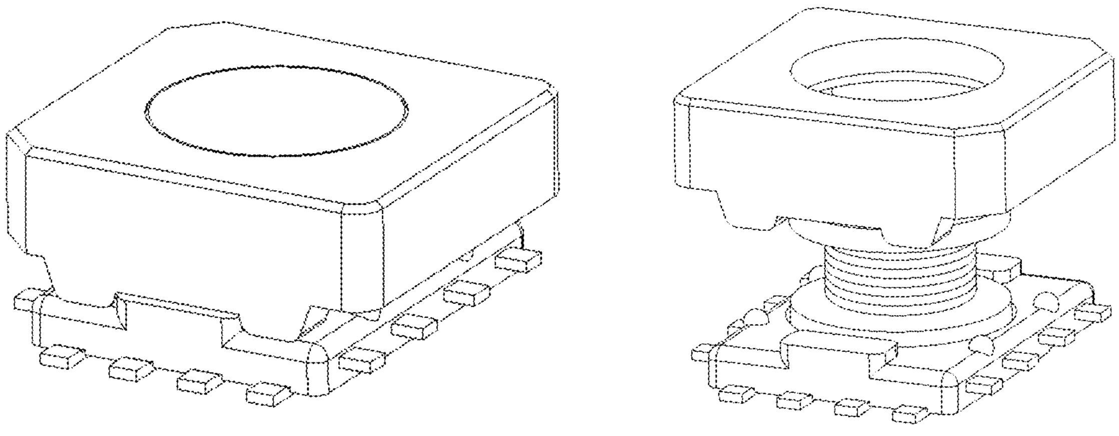
FIG. 1 is a structure diagram of an example laminated transformer.

Referring now to FIG. 1, shown is a structure diagram of an example laminated transformer. In this example, since the wall thickness of the traditional ferrite after a sintering process can be at least 0.5 mm, a magnetic core upper covering plate, a magnetic core lower covering plate, and a winding line space may cause the height of the traditional transformer to be at least 1.5 mm (the thinnest commodity inductance also needs 2 mm), which makes the transformer bulky with a relatively large thermal resistance. In order to achieve miniaturization and a reduction in the height of transformer, a transformer having a laminated structure may be utilized. However, some laminated transformers have a relatively low coupling coefficient, and it may be difficult to achieve the desired characteristics of the transformer.

In one embodiment, a laminated transformer can include: (i) a plurality of magnetic layers; (ii) a plurality of coil layers including a primary coil having a first type of coil layer, and a secondary coil having a second type of coil layer, where each coil layer is laminated between a pair of the plurality of magnetic layers; and (iii) a plurality of non-magnetic layers, where a first of the plurality of non-magnetic layers is disposed between an adjacent pair of the coil layers in order to increase a coupling coefficient between the primary and secondary coils.

Figure 2:
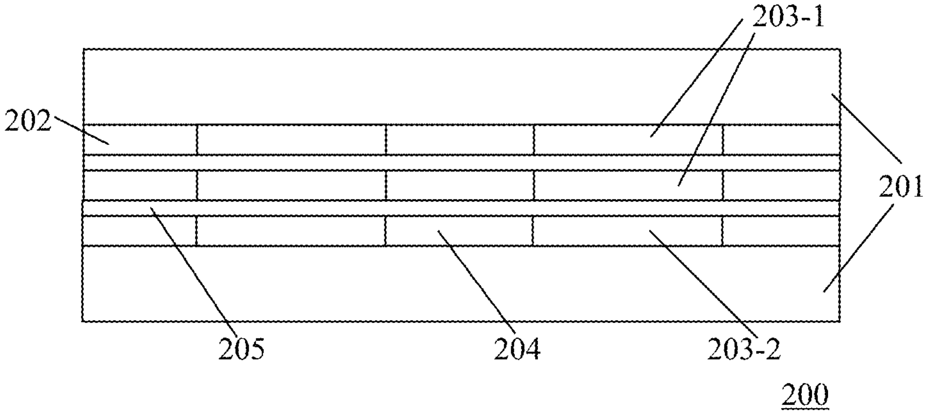
FIG. 2 is a cross-sectional diagram of an example laminated transformer, in accordance with embodiments of the present invention.

Referring now to FIG. 2, shown is a cross-sectional diagram of an example laminated transformer, in accordance with embodiments of the present invention. In this particular example, the laminated transformer can include magnetic layers 201, winding layers 202, and non-magnetic layers 205. For example, winding layers 202 can be sequentially laminated between two layers of the magnetic layers 201. Each of winding layers 202 can include a coil 203 and magnetic material body 204 cladding the coil. The coils can include a primary coil having a first type of coil layers 203-1, and a secondary coil having a second type of coil layers 203-2, which will hereinafter be collectively referred to as coil 203. The primary coil can include one layer or more layers the first type of coil layer, and the secondary coil can include one layer or more layers the second type of coil layer.

Non-magnetic layer 205 can at least be located between adjacent the first type of coil layers and the second type of coil layers, in order to increase coupling coefficient between the primary coil and the secondary coil. In addition, non-magnetic layer 205 may be disposed between two adjacent layers of the first type of coil layers and/or between two adjacent layers of the second type of coil layers. For example, non-magnetic layer 205 may be disposed between two adjacent layers of winding layers 202 (e.g., coil layers 203). That is, there can be a layer of non-magnetic layer 205 between each of two adjacent winding layer 202. For example, non-magnetic layer 205 may be ceramic material. The thickness of magnetic layer 201 can be greater than the thickness of winding layer 202, in order to prevent saturation of the magnetic flux of the transformer.

For example, the first type of coil layers 203-1 may be disposed to be adjacent in sequence, and the second type of coil layers 203-2 can be disposed to be adjacent in sequence. A plurality of first type of coil layers 203-1 can be connected in series or in parallel, and a plurality of second type of coil layers 203-2 can be connected in series or in parallel. The other areas of winding layer 202 except coil 203 can be magnetic material body 204. For example, magnetic layer 201 and magnetic material body 204 may be selected from the same magnetic material, or from different magnetic materials. For example, a magnetic material of high magnetic permeability (e.g., metal powder core, amorphous powder core, etc.) may be selected. Coil 203 may be a metal, such as such as silver or copper. Those skilled in the art will recognize that the number of turns of the coil, the specific connection manner, and the positions of the input and output ends can vary according to different applications.

In addition, the laminated transformer can also include a connecting body for connecting two adjacent layers of the coil layer. For example, the connecting body can be used for connecting two adjacent layers of first type of coil layers, and connecting two adjacent layers of the second type of coil layers. The connecting body can penetrate the non-magnetic material layer, in order to connect adjacent two layers of the first type of coil layers, or to connect two adjacent layers of the second type of coil layers. The connecting body can include a conductive material structure.

Figure 3:
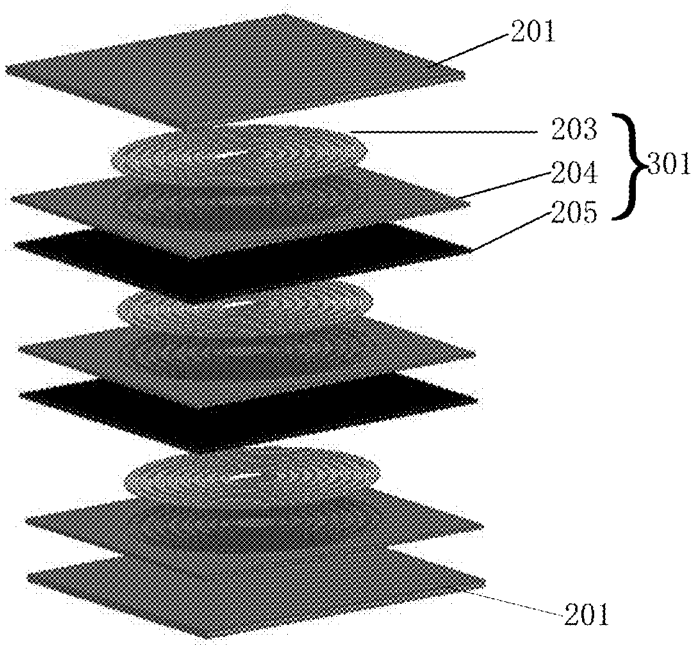
FIG. 3 is a three dimensional view diagram of an example laminated transformer, in accordance with embodiments of the present invention.

Referring now to FIG. 3, shown is a three dimensional view diagram of an example laminated transformer, in accordance with embodiments of the present invention. In this particular example, coil 203 and magnetic material body 204 can be located in the same layer, and in this view can be broken down to see more clearly. Coil 203 can be spiral in a direction perpendicular to the laminating direction. Coil 203 and magnetic material body 204 may together form the winding layer. Also, the edge regions of the winding layer can be magnetic material body 204, in order to provide a transmission path for the main magnetic flux of the laminated transformer. The winding layer (e.g., coil 203 and magnetic material body 204) and non-magnetic layer 205 may form structure 301. Also, a plurality of such structures can be laminated between two layers of magnetic layer 201.

In the particular example of FIG. 3, since non-magnetic layer 205 is located between the adjacent winding layers, there may be structure 301 adjacent to one of magnetic layers 201, and while the winding layer (e.g., coil 203 and magnetic material body 204) is included in this instance of structure 301, the non-magnetic layer 205 is not included in structure 301 for this particular instance (see, e.g., structure 301 that is adjacent to lower magnetic layer 201, which does not include a non-magnetic layer 205). However, in some cases, there may be a non-magnetic layer 205 included in each of structures 301. In addition, the number of the structures 301 is not limited in certain embodiments, and those skilled in the art will recognize that any number of layers can be laminated according to the application requirements.

Figure 4:
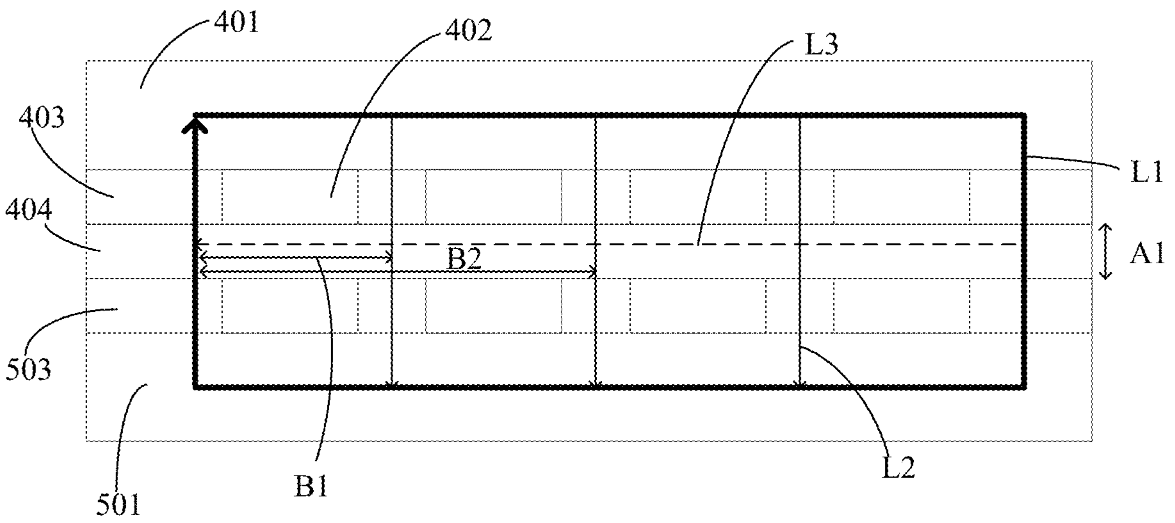
FIG. 4 is a diagram of an example increase in the coupling coefficient of the laminated transformer, in accordance with embodiments of the present invention.

Referring now to FIG. 4, shown is a diagram of an example increase in the coupling coefficient of the laminated transformer, in accordance with embodiments of the present invention. In this particular example, the laminated transformer has two winding layers. When the laminated transformer is in operation, the magnetic flux path of the transformer can mainly be divided into three routes: route L1, route L2, and route L3. For example, route L1 is a path through which the main magnetic flux passes. Route L1 begins from magnetic layer 401, and passes through the magnetic material body of a first edge region of first winding layer 403, a first edge region of non-magnetic layer 404, the magnetic material body of a first edge region of second winding layer 503, second magnetic layer 501, the magnetic material body of a second edge region of second winding layer 503, a second edge region of non-magnetic layer 404, the magnetic material body of a second edge region of first winding layer 403, and returns to magnetic layer 401 to form a closed magnetic line of force.

For example, the first edge region of first winding layer 403, the first edge region of non-magnetic layer 404, and the first edge region of second winding layer 503 may all be on the same side. The second edge region of first winding layer 403, the second edge region of non-magnetic layer 404, and the second edge regions of second winding layer 503 may all be located on the same side. And, the first edge regions are opposite to the second edge regions. Route L2 is a path through which a portion of the magnetic flux passes. For example, route L2 begins from first magnetic layer 401, passes through the magnetic material body of first winding layer 403, non-magnetic layer 404, and the magnetic material body of second winding layer 503, then reaches second magnetic layer 501 and passes through magnetic material body of the second edge region of second winding the layer 503, the second edge region of non-magnetic layer 404, and magnetic material body of the second edge region of first winding layer 403, and returns to first magnetic layer 401 to form a closed magnetic line of force.

Route L3 is a path through which a small portion of the magnetic flux passes, route L3 begins from first magnetic layer 401, and passes through the magnetic material body of first winding layer 403, and then transversely passes through non-magnetic layer 404 (e.g., a direction perpendicular to the lamination direction of the laminated transformer), reaches the second edge region of non-magnetic layer 404, then passes through magnetic material body of the second edge region of first winding layer 403 and returns to first magnetic layer 401 to form a closed magnetic line. For example, the thickness of non-magnetic layer 404 is configured as A1, and the length of non-magnetic layer 404 through which the smallest magnetic flux closure line in route L3 passes is B1. For example, the width of coil 402 can be set to be relatively large, such that B1 is larger than A1.

Since the magnetic permeability of non-magnetic layer 404 is relatively small, the magnetic resistance of the magnetic flux through the route L3 can be much larger than the magnetic resistance through the routes L2 and L1, and most of the magnetic flux may not flow through the route L3. This can allow more magnetic flux to pass through paths L1 and L2, thereby the coupling coefficient between the two layers of windings can be increased. In some embodiments, a coil can be set having a relatively small width such that B1 is less than A1, and then more of the magnetic flux here can be transmitted along route L3, which affects the coupling of the first turn of coil. However, the length of non-magnetic layer 404 through which the magnetic flux closure line of the second turn of the coil passes is B2, and B2 is the width of the two turns of the coil and the spacing between the two turns of coil, which are generally greater than thickness A1 of the non-magnetic layer (e.g., the spacing between the coils may generally be set to be wide to prevent short circuits between the coils), and thus most of the magnetic flux here may still be transmitted along route L2.

Similarly, for the third turn, fourth turn, etc., the most magnetic flux of the nth coil may be transmitted along route L2. Therefore, if B1 is less than A1, this may only affect the coupling of the first turn of coil, and may not have much influence on the coupling coefficient of the entire laminated transformer. Here, the smaller the thickness of the non-magnetic layer 404, the smaller the magnetic flux transmitted along the horizontal direction of the non-magnetic layer, and the higher the coupling coefficient between the coils. The specific thickness of the non-magnetic layer can be related to the structure of the laminated transformer, and the magnetic permeability of the magnetic layer and the magnetic material body may be related to the width of the coil. Also, each of the routes in FIG. 4 may have a plurality of magnetic lines of force that are described by the magnetic flux passing through each path to illustrate that the presence of the non-magnetic layer increases the amount of magnetic flux that passes through the paths L1 and L2, thereby increasing coupling coefficient between the windings.

In particular embodiments, the primary coil and the secondary coil of the transformer may each include at least one layer coil disposed horizontally, and the coil layer of each layer can be cladded with a magnetic material to form a winding layer. A non-magnetic layer formed of a non-magnetic material can be at least horizontally disposed between of the adjacent primary and the secondary coil. The transformer manufactured by the lamination process can reduce the thickness of the transformer (e.g., to less than about 0.5 mm), and can reduce thermal resistance of the transformer, thus improving the thermal performance of the transformer.

The magnetic layer and the magnetic material body may have a magnetic permeability of about 20 u to 2000 u, and the non-magnetic layer may have a magnetic permeability of 1 u. The non-magnetic layer can be disposed between adjacent winding layers in order to increase the magnetic resistance and change the flow direction of the magnetic flux, such that most magnetic flux may transmit along the lamination direction of the transformer. Further, a suitable thickness of the non-magnetic layer can be set to reduce the magnetic flux transmitted along the horizontal direction of the non-magnetic layer, such that more magnetic flux is transmitted along the edge regions of the laminated winding layers, thereby improving the inter-coil coupling coefficient.

In one embodiment, method of making a laminated transformer, can include: (i) casting a non-magnetic material on a film to form a non-magnetic layer; (ii) performing a screen printing process on the non-magnetic layer to form a winding layer, including a magnetic material body and a coil; and (iii) performing a pressing process to laminate two magnetic layers and a plurality of structures including the non-magnetic layer and the winding layer, where the plurality of structures are laminated between two layers of the magnetic layers.

Figure 5A:
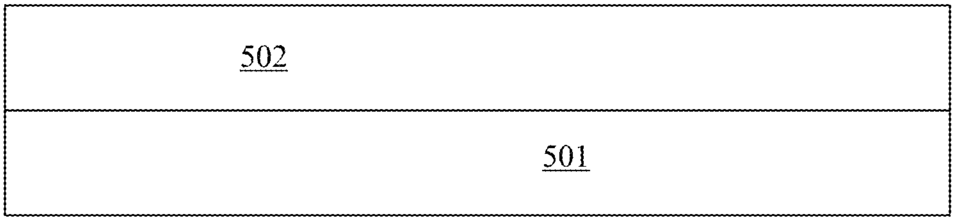
FIGS. 5A-5G are cross-sectional view diagrams of various steps of an example method of manufacturing a laminated transformer, in accordance with embodiments of the present invention.

Referring now to FIGS. 5A-5G, shown are cross-sectional view diagrams of various steps of an example method of manufacturing a laminated transformer, in accordance with embodiments of the present invention. In FIG. 5A, film 501 can be provided on which a non-magnetic material is cast to form non-magnetic layer 502. For example, the non-magnetic material can be a ceramic material.

Figure 5B:
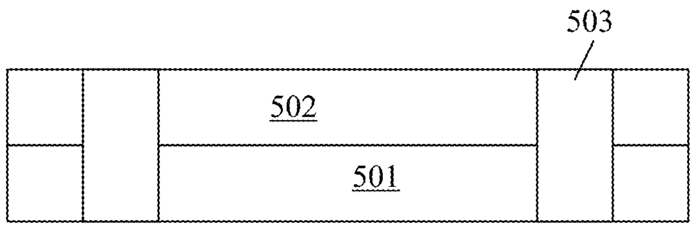

As shown in FIG. 5B, a first opening may be formed in film 501 and non-magnetic layer 502, and a metal material can be filled in the first opening to form conductive pillar 503. For example, a silver paste can be selected to form silver pillar 503 as an interlayer connection.

Figure 5C:
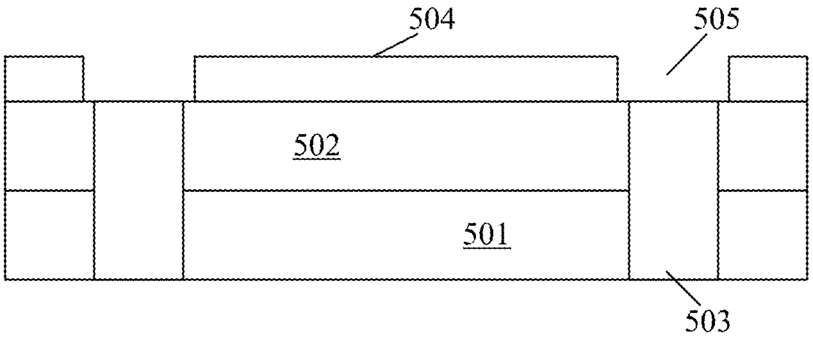

As shown in FIG. 5C, a metal magnetic paste can be screen printed on non-magnetic layer 502 to form magnetic material body 504 having second opening 505. The upper surface of silver pillar 503 can be exposed by second opening 505. The diameter of second opening 505 may be greater than the diameter of the first opening. In this example, magnetic material body 504 can be configured as ferrite. Of course, those skilled in the art will recognize that other high magnetic permeability core materials, such as amorphous powder cores and the like, can also be employed in certain embodiments.

Figure 5D:
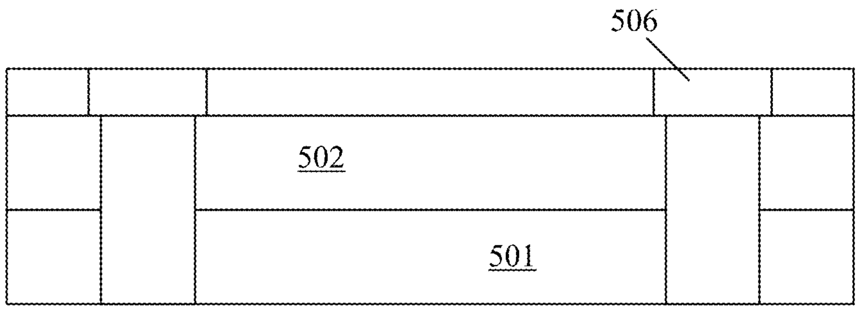

As shown in FIG. 5D, silver paste can be filled in second opening 505 to form coil 506. For example, coil 506 and magnetic material body 504 may together form a winding layer. In some cases, the coil may be more than one turn, so silver pillar 503 may only be in contact with the partial coil 506. That is, electrical connection can be achieved, so the specific position of the silver pillar may be related to the arrangement and interior connection structure of the coils of the laminated transformer. Alternatively, coil 506 can be formed by other metal pastes, such as copper paste.

Figure 5E:
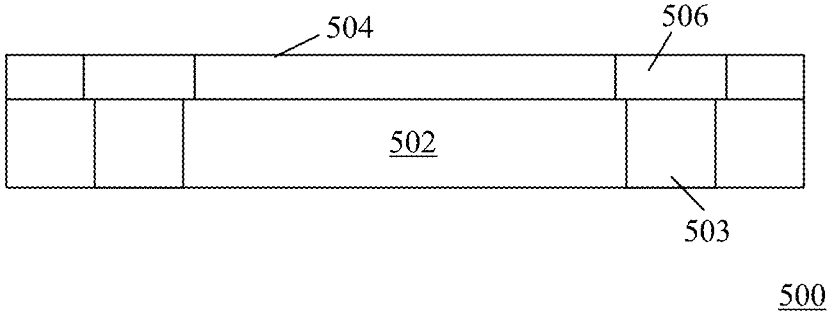

As shown in FIG. 5E, film 501 can be removed to form a structure 500 including non-magnetic layer 502 and the winding layer, where the winding layer includes coil 506 and magnetic material body 504.

Figure 5F:
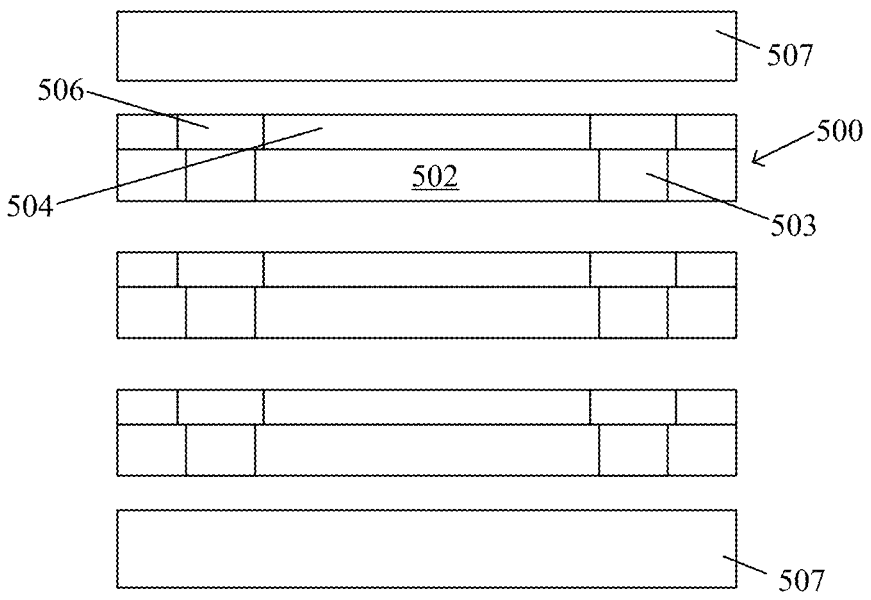

As shown in FIG. 5F, two layers of magnetic layers 507 and the plurality of structures 500 are laminated. For example, the plurality of structures 500 can be laminated between two layers of magnetic layers 507. In this particular example, non-magnetic layer 502 in each layer of structure 500 can include silver pillar 503. Alternatively, non-magnetic layer 502 in some layers of structure 500 may not include silver pillar 503, and whether the silver pillar is utilized can be determined according to connection design of the specific internal coil and the interlayer connection design of the laminated transformer.

It should be noted that if the silver pillars may not be included in non-magnetic layer 402 of some layers, and in this case the step of FIG. 5B may be omitted, and non-magnetic layer 502 in FIG. 5C can be exposed by second opening 505.

Figure 5G:
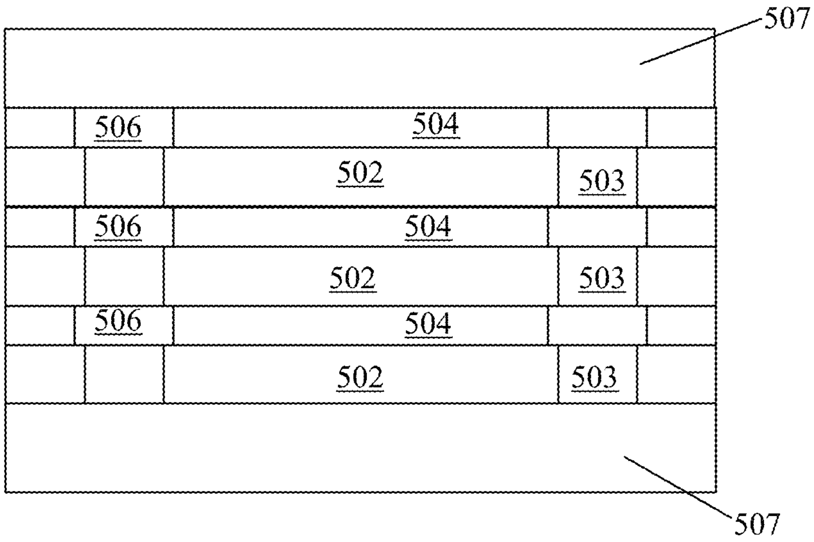

As shown in FIG. 5G, cutting the actual size of the transformer, and a conventional process such as sintering and gluing may be performed to form a structure of a laminated transformer.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A laminated transformer, comprising:

a) a first magnetic layer and a second magnetic layer;

b) a plurality of winding layers, each winding layer comprising a magnetic material body and a coil layer cladded by the magnetic material body, wherein the plurality of winding layers comprise a primary winding having a first type of winding layers, and a secondary winding having a second type of winding layers, wherein the plurality of winding layers is laminated in sequence between the first magnetic layer and the second magnetic layer, wherein the magnetic material body and the coil layer of each winding layer have a same thickness; and c) a plurality of non-magnetic layers, wherein a first of the plurality of non-magnetic layers is disposed between adjacent layers of one of the first type of winding layers and one of the second type of winding layers, in order to increase a coupling coefficient between the primary and secondary windings, and wherein each non-magnetic layer and each winding layer fully overlap in a lamination direction.

2. The transformer of claim 1, wherein a second of the plurality of non-magnetic layers is disposed between two adjacent layers of the primary winding.

3. The transformer of claim 1, wherein a second of the plurality of non-magnetic layers is disposed between two adjacent layers of the secondary winding.

4. The transformer of claim 1, wherein layers of the primary winding are disposed to be adjacent in sequence, and layers of the secondary winding are disposed to be adjacent in sequence.

5. The transformer of claim 1, wherein each of the plurality of winding layers is spirally in a direction perpendicular to the lamination direction of the laminated transformer.

6. The transformer of claim 1, wherein a thickness of each of the plurality of non-magnetic layers is greater than a thickness of the winding layer.

7. The transformer of claim 1, wherein each of the plurality of non-magnetic layers is configured as a ceramic layer.

8. The transformer of claim 1, further comprising a first connecting body for connecting adjacent two layers of the primary winding, and a second connecting body for connecting adjacent two layers of the secondary winding.

9. The transformer of claim 8, wherein the connecting body comprises a conductive material structure.

10. The transformer of claim 8, wherein the connecting body penetrates the non-magnetic layer to connect to adjacent two layers of the first type of winding layer, or adjacent two layers of the second type of winding layer.

* * * * *